US006983255B2

(12) United States Patent
Linehan

(10) Patent No.: US 6,983,255 B2
(45) Date of Patent: Jan. 3, 2006

(54) TELEVISION COMMERCE PAYMENTS

(75) Inventor: Mark H. Linehan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 10/891,241

(22) Filed: Jul. 14, 2004

(65) Prior Publication Data

US 2004/0249726 A1 Dec. 9, 2004

Related U.S. Application Data

(62) Division of application No. 09/469,007, filed on Dec. 21, 1999.

(51) Int. Cl.
*G06F 17/60* (2006.01)
(52) U.S. Cl. .......................................... 705/26; 725/100
(58) Field of Classification Search ................... 705/26
See application file for complete search history.

(56) References Cited

U.S. PATENT DOCUMENTS

| | | | |
|---|---|---|---|
| 5,070,400 A * | 12/1991 | Lieberman .................. 725/151 |
| 5,404,393 A | 4/1995 | Remillard |
| 5,600,364 A | 2/1997 | Hendricks et al. |
| 5,838,314 A | 11/1998 | Neel et al. |
| 5,878,141 A | 3/1999 | Daly et al. |
| 5,880,720 A | 3/1999 | Iwafune et al. |
| 6,000,832 A | 12/1999 | Franklin et al. |
| 6,029,141 A | 2/2000 | Bezos et al. |
| 6,282,713 B1 | 8/2001 | Kitsukawa et al. |
| 6,366,893 B2 | 4/2002 | Hannula et al. |
| 6,389,403 B1 * | 5/2002 | Dorak, Jr. ..................... 705/52 |
| 6,398,245 B1 * | 6/2002 | Gruse et al. .................... 705/1 |
| 6,449,599 B1 | 9/2002 | Payne et al. |
| 6,560,581 B1 * | 5/2003 | Fox et al. ...................... 705/51 |
| 6,792,615 B1 * | 9/2004 | Rowe et al. ................... 725/37 |
| 2002/0038292 A1 * | 3/2002 | Quelene ...................... 705/80 |

FOREIGN PATENT DOCUMENTS

WO    WO 9731480    * 8/1997

OTHER PUBLICATIONS

"Thailand: PRD Offers CAble TV Licences" Bangkok Post (XBN), Jun. 8, 1995, p.B1.*

* cited by examiner

*Primary Examiner*—Lynda Jasmin
(74) *Attorney, Agent, or Firm*—Gregory M. Doudnikoff; Marcia L. Doubet; Martin J. McKinley

(57) ABSTRACT

A method, system, and computer readable code for extending payment protocols to include information related to the television context of commercial activity between a consumer using a television (or a set-top box) and a merchant, thereby enabling "TV commerce" to generate additional revenue streams which may include payments to the operator of the television system, as well as to various other parties (such as a cable or satellite provider who is providing the broadcast, the ad agency responsible for creating the advertisement from which the consumer made his purchase, etc.) involved with television advertisements and programs. A number of different payment protocols may be used for these TV commerce transactions, where the protocol messages are then augmented according to the present invention to include TV context data. Upon receiving the funds for a TV commerce purchase, the revenue is allocated and distributed to one or more parties associated with the television program or advertisement the consumer was viewing at the time of his purchase.

6 Claims, 6 Drawing Sheets

TELEVISION COMMERCE PAYMENTS

RELATED INVENTION

The present invention is a Divisional of commonly-assigned Ser. No. 09/469,007, filed on Dec. 21, 1999 which is titled "Television Commerce Payments" and which is hereby incorporated herein by reference.

BACKGROUND OF THE INVENTION

1. Field of the Invention

The present invention relates to a computer system, and deals more particularly with a method, system, and computer program product for extending payment protocols to include information related to the television context of commercial activity between a consumer using a television (or a set-top box) and a merchant, thereby enabling "TV commerce" to generate additional revenue streams.

2. Description of the Related Art

Electronic commerce, also commonly referred to as "e-commerce" or "e-business", has become an overwhelmingly popular way of doing business on the Internet and World Wide Web (where the World Wide Web, hereinafter "Web", is a subset of the Internet). The Internet is a vast collection of computing resources, interconnected as a network, from sites around the world. It is used every day by millions of people. With this growth, the commercial aspects of the Internet have also grown. Using the Internet for "on-line shopping", a consumer today is able to purchase items from merchants around the corner, as well as from merchants around the globe and anywhere in between, all from the comfort of the consumer's own home. (Hereinafter, the terms "Internet" and "Web" are used interchangeably unless otherwise noted.)

Many Internet purchases are made by a consumer navigating directly to, and interacting with, a merchant's Web site. In this situation, the allocation of funds is clear: the purchase price is paid by the consumer to the merchant (minus any fees that might be owed to a third party such as a credit card company). However, Internet purchases are also frequently made by consumers who see the merchant's product as an advertisement on a different company's Web page (such as the Web page of a news service, search facility, etc.) Today, many Web sites contain advertisements of this type (commonly referred to as "affiliate programs"), where the advertisement provides a source of revenue for the site operator in a similar manner to the way in which merchants buying commercial air time provide revenues for broadcast television stations. Web advertisements today offer literally any kind of product and service a consumer might desire. As in most advertising, the Web advertiser rewards the site operator for showing the advertisement. In the Web context, this may involve paying the site operator a percentage of the sales generated through the Web site, paying a flat fee for each person selecting to view the advertiser's site, or some other comparable type of payment.

In the near future, this type of on-line shopping or electronic commerce is expected to be extended to viewers of television programs. The shopping functionality may be provided in a specially-enhanced television set, in a set-top box, or in other similar mechanisms which allow the television viewer to interact with a merchant's advertisement—for example, by using a browser-like function and a pointing device to indicate that the viewer would like to purchase a particular item. The interactive nature of the advertisements presented on television programs will then enable merchandising transactions to take on the same instantaneous character that the consumer has become accustomed to in the Internet environment. ("Set-top box" refers to commercially-available devices that, among other functions, enable a television set to function as a TV viewer's interface to the Internet. A set-top box typically contains software analogous to the Web browser software with which a computer user connects to, and interacts with, the Internet.) When on-line shopping moves to the television environment, however, there is no existing technique for the television operators to obtain revenues from this new shopping paradigm—even though a business agreement to this effect may be reached by the parties involved. The merchandising in the new on-line television shopping environment will occur between the viewer/consumer and the merchant as a series of electronic messages. Absent any special technical arrangement, these message exchanges may be transparent to the television system operator. (This transparency is particularly evident if payments for selected items are handled using forms-based credit card messages, as a "form" in this sense is a general-purpose electronic message which does not identify or distinguish a payment form from any other type of forms-based message, such as a mere inquiry or inquiry response form.)

It would be advantageous if various organizations responsible for delivering television programs were able to automatically share in the profits generated by merchandising in this new television shopping paradigm. These organizations, referred to hereinafter as "TV originators", include: broadcast networks; TV stations or channels; program originators; program publishers; advertisers; advertising agencies; the cable or satellite TV system operators; and others. TV originators in general are those organizations involved in producing or distributing either TV programs or advertisements contained in TV programs. (Note that merchants—the company or individual who offers a product for sale—are not included within this definition of TV originators, as the merchants will participate in the merchandising revenue as a matter of course.)

Accordingly, what is needed is a technique with which TV originators can obtain a revenue stream from the TV commerce generated by consumers who purchase merchandise (or services) in this new television shopping paradigm. The present invention defines a technique for extending payment protocols to include information related to the TV context (e.g. detailed data such as identification of the provider of the television program or advertisement being viewed when a purchase is initiated) in which viewer purchases are made using a television or set-top box. This information is then used, according to the present invention, to enable TV originators to share in the profits (e.g. as a percentage of the sales totals) associated with viewer purchases.

SUMMARY OF THE INVENTION

An object of the present invention is to provide a technique to gather identifying information related to commercial activities between a TV viewer and a merchant when the viewer/consumer is interacting with a television or set-top box.

Another object of the present invention is to provide this technique to enable auditing and accounting of TV commerce information.

Still another object of the present invention is to provide a technique whereby television operators may be provided with information related to commerce between a viewer/ consumer and merchant that enables the generated revenue stream to be more equitably divided.

A further object of the present invention is to provide this technique whereby the revenue stream is automatically divided and allocated upon receiving a viewer's payment for a TV commerce transaction.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, system, and method for use in an interactive television environment having a connection to a computer network, for enabling TV commerce to generate additional revenue streams. This technique comprises: initiating a TV commerce purchase by a consumer; gathering TV context information related to the purchase; and including the gathered context information in a payment message corresponding to the purchase.

In one aspect, this technique further comprises: sending, responsive to the initiating, a purchase request for the purchase from the consumer to a computer in the interactive television environment; receiving the purchase request at the computer; forwarding the purchase request from the computer to a merchant connected to the interactive television environment; receiving the forwarded purchase request at the merchant; sending a payment initiation message for the purchase, responsive to receiving the forwarded purchase request, from the merchant to the consumer through the interactive television environment; receiving the sent payment initiation message by the consumer; augmenting the received payment initiation message with the gathered TV context information, thereby creating the payment message corresponding to the purchase; forwarding the payment message to an issuing bank; receiving the forwarded payment message at the issuing bank; creating at the issuing bank, responsive to receiving the forwarded payment message, an authorization token for the purchase; sending the authorization token and the TV context information from the issuing bank to the consumer; forwarding the sent authorization token and the TV context information from the consumer to the merchant; receiving the forwarded authorization token and the TV context information at the merchant; sending, responsive to receiving the forwarded authorization token and the TV context information, a capture request from the merchant to an acquiring bank, along with the received authorization token and the received TV context information; receiving the capture request, the received authorization token, and the received TV context information at the acquiring bank; and charging, responsive to receiving the capture request, the received authorization token, and the received TV context information, an account of the consumer for the purchase.

The TV context information may be included as a part of the authorization token. The payment initiation message may be a wallet initiation message, in which case the gathered TV context information augments the received wallet initiation message, thereby creating the payment message corresponding to the purchase. This technique then preferably further comprises: invoking a wallet program upon receipt of the sent payment initiation message by the consumer; logging on to the wallet program by the consumer, thereby creating consumer log-on data; and including the consumer log-on data when the payment message is forwarded to the issuing bank.

The payment initiation message may be digitally signed by the merchant using a digital certificate of the merchant, and the authorization token may be digitally signed by the issuing bank using an issuing bank digital certificate. In this case, the technique further comprises: verifying the digitally signed payment initiation message using the digital certificate of the merchant; and verifying the digitally signed authorization token using the issuing bank digital certificate.

The technique may further comprise authenticating the consumer by digitally signing the payment message by the consumer using a consumer digital certificate and verifying the digitally signed payment message using the consumer digital certificate. Or, the technique may further comprise authenticating the consumer by using a shared key known to the consumer and the issuing bank.

The technique may further comprise using the included context information for allocating a portion of a payment represented by the payment message to one or more TV originators. Using this included context information preferably further comprises extracting an identification of each of the TV originators from the included context information, and allocating a predetermined percent of the payment to each of the identified TV originators. In addition, the included context information may be sent from the acquiring bank to at least one of the identified TV originators.

The technique may further comprise: initiating a payment transaction by the consumer; gathering TV context information related to the payment transaction; and including the gathered TV context information in a message corresponding to the payment transaction.

In another aspect, this technique further comprises: sending, responsive to the initiating, a purchase request for the purchase from the consumer to a computer in the interactive television environment; receiving the purchase request at the computer; forwarding the purchase request from the computer to a merchant connected to the interactive television environment; receiving the forwarded purchase request at the merchant; sending a payment initiation message for the purchase, responsive to receiving the forwarded purchase request, from the merchant to the consumer through the interactive television environment; receiving the sent payment initiation message by the consumer; augmenting the received payment initiation message with the gathered TV context information, thereby creating the payment message corresponding to the purchase; returning the payment message to the merchant; forwarding the returned payment message from the merchant to a card company or bank; charging, responsive to receiving the forwarded payment message, an account of the consumer for the purchase; and paying the merchant for the purchase.

In this aspect, the payment initiation message may be a wallet initiation message, in which case the gathered TV context information augments this received wallet initiation message, thereby creating the payment message corresponding to the purchase, and the technique may further comprise: invoking a wallet program upon receipt of the sent payment initiation message by the consumer; logging on to the wallet program by the consumer, thereby creating consumer log-on data; and including the consumer log-on data when the payment message is forwarded to the merchant.

The payment initiation message may be digitally signed by the merchant using a digital certificate of the merchant. In this case, the technique further comprises verifying the digitally signed payment initiation message using the digital certificate of the merchant.

The technique may further comprise authenticating the consumer by digitally signing the payment message by the consumer using a consumer digital certificate and verifying the digitally signed payment message using the consumer digital certificate. Or, the technique may further comprise authenticating the consumer by using a shared key known to the consumer and the issuing bank.

Also in this aspect, the technique may further comprise using the included context information for allocating a portion of a payment represented by the payment message to one or more TV originators, where using the included context information preferably further comprises extracting an identification of each of the TV originators from the included context information and allocating a predetermined percent of the payment to each of the identified TV originators. Optionally, the included context information may be sent from the card company or bank to at least one of the identified TV originators.

The present invention will now be described with reference to the following drawings, in which like reference numbers denote the same element throughout.

DESCRIPTION OF THE PREFERRED EMBODIMENTS

Figure 1:
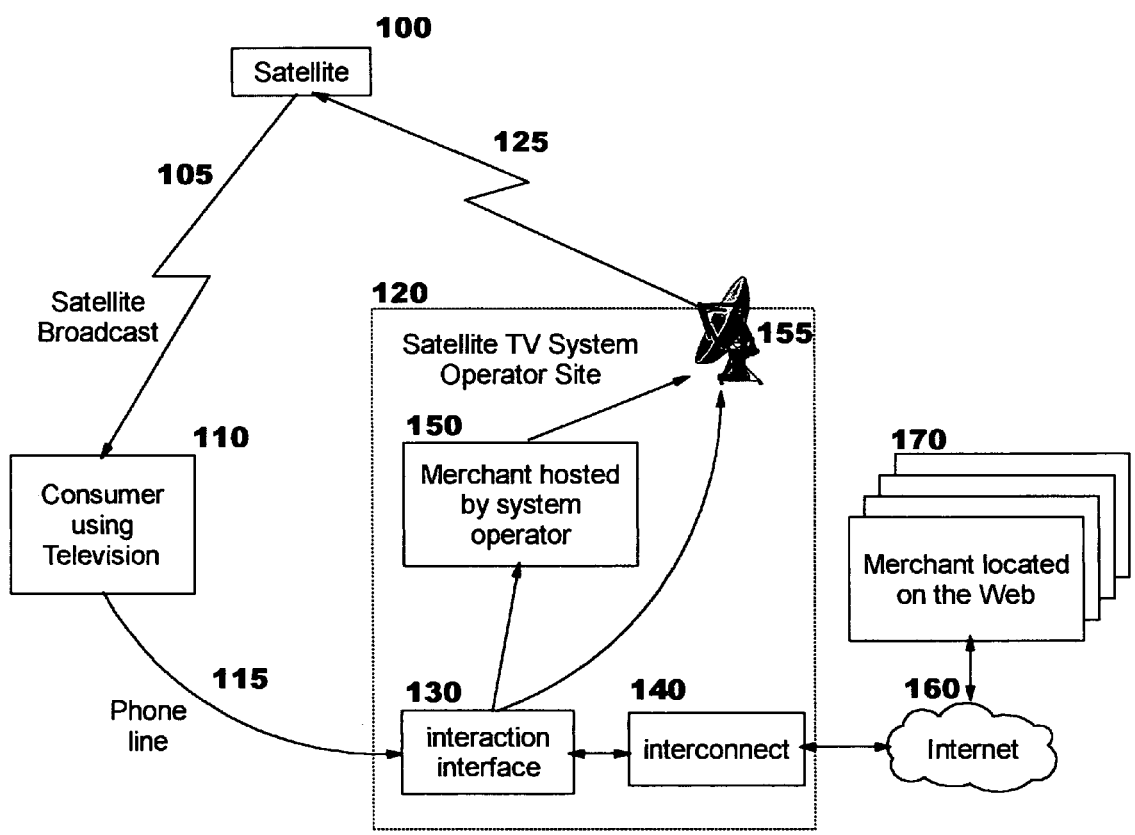
FIGS. 1 and 2 illustrate a satellite television system and a cable television system in which the present invention may be practiced, respectively.

The functions of the present invention, as embodied within a set-top box or television set, operate upon requests that come from a viewer having a television or set-top box input device such as a remote control, a wireless keyboard, a pointing device such as a mouse, or any other form of device that allows the viewer to communicate with the television or set-top box software. A set-top box is a specialized computer in that its only applicable use is with a television signal provider (such as a broadcast, cable, or satellite TV service provider). Within this specialized computer typically runs a Web browser for communicating with the World Wide Web, as previously stated, and possibly other software capable of functions such as programmed "on" and "off" times, limitations on channels that may be viewed (e.g. parental controls), etc. Today, these functions are located in a separate device (i.e. the "set-top box") which is attached to the television set. Future enhancements will likely include television sets that incorporate the functions provided by the set-top box, without the need for having the external box.

Revenue collection is an important issue for TV originators. In the context of interactive TV commerce as described herein, the TV originators may hope to receive a percentage of sales made by merchants from viewers of television programs or advertisements associated with the TV originator. Depending upon commercial market conditions, merchants may be willing to grant such a percentage in order to exploit TV as an additional channel to reach consumers. Banks and credit card associations may be willing to assist in revenue collection (using the techniques of the present invention, as described below) in order to extend their credit and debit card systems into the new world of TV commerce.

The present invention enables TV originators to obtain various types of information about consumer TV commerce. This information may be useful for tracking consumer buying habits and for providing targeted advertising for consumers, and more particularly may be used to enable these TV-related organizations to obtain part of the revenue stream from the TV commerce. While agreements may be reached between TV originators and merchants (for example, by written contract) as to the sharing of revenue for TV commerce, there is currently no automated technique for enforcing such an agreement. The present invention provides a solution to this problem, defining how existing payment protocol messages may be augmented to provide TV context information related to a consumer's purchase and how this context information may be processed to enforce the revenue sharing agreement(s).

The preferred embodiments of the present invention will now be discussed with reference to FIGS. 1 through 6.

In the preferred embodiments, the present invention is implemented as one or more modules (also known as "objects" in object-oriented programming languages) of one or more computer software programs. This computer software will be used in an environment where a consumer is interacting with a television or set-top box to purchase items from a merchant who advertises products using a television delivery facility. (Alternatively, the consumer may be using other types of interaction devices which provide television shopping capabilities.) The system in use must provide an interaction interface which allows the consumer to interact with the television content currently being viewed. For example, satellite services provide an interaction interface, typically a telephone line, which allows the consumer's television or set-top box to communicate or provide input and feedback to the merchant for making a purchase. If the consumer is using a cable service, this service must also provide a return signal path back to the cable service through the cable system, or provide the consumer with the capability to use a telephone or some other means of consumer input and feedback (hereinafter, "input") to the system. In the broadcast television environment, the consumer may use a conventional telephone or other device such as a cellular radio as the return signal path for communicating input to the TV provider.

FIG. 1 depicts a typical satellite television system environment in which the present invention may be practiced. When used with a satellite TV system, the present invention assumes that the consumer's antenna and TV and/or set-top box receive TV signals from a satellite. E-commerce purchases are preferably made by communicating from the TV and/or set-top box via a phone line to an interaction interface maintained at the satellite TV operation center or elsewhere, as stated above. This interaction interface receives incoming messages from the consumer's TV and/or set-top box, and routes them to merchants, as will now be discussed with reference to the configuration in FIG. 1. Any response messages flow back from the merchants through the interaction interface to the consumer's TV and/or set-top box.

As shown in FIG. 1, the satellite television system operator site 120 is comprised of the satellite transmission facility 155 which transmits 125 the satellite programming to the satellite 100. The satellite in turn transmits 105 the television signal back to a satellite receiver (not shown) located at the consumer's location 110. This receiver is attached to a set-top box, or to a television with the functions associated with a set-top box incorporated within it. Input generated by the consumer may be sent back to the satellite operator site 120 using the telephone line 115. At the satellite operator's site 120, this input is received at the interaction interface 130 which processes the input. According to the present invention, the interaction interface 130 determines if the consumer's input should be directed to the Internet 160 to reach a merchant through a Web site 170, or should be directed to a local processor (not shown) within the satellite operator's site 120 to reach a merchant 150 hosted by the satellite service operator. Input for the Internet 160 is routed through the interconnect 140 which provides access to the Internet 160 and ultimately the merchant's Web site 170. If the input is not directed to a merchant on the Internet 160, it is processed locally at the satellite operator's site 120. When the processing of the consumer input is completed (either locally at the satellite operator's site or through the Internet), the results or response (if any) may be sent out 125, 105 through the satellite system transmission facilities to the original consumer's television 110 (or, the response may be returned to the consumer over phone line 115). (Hereinafter, the means of communicating with the consumer regarding his TV commerce purchase will be referred to as the "return signal path" for ease of reference, whether the communication occurs over a phone line or satellite transmission, via a cable modem, etc.).

For example, if a consumer is viewing a merchant's advertisement and determines he would like to purchase an item, the consumer interacts with the television or set-top box 110 in a similar manner to a user communicating with a computer. Using a mouse, wireless remote, touch-sensitive screen, or other such device, the consumer indicates to the set-top box or television 110 that he wishes to purchase an item. This action creates consumer input which is sent 115 to the interaction interface 130 at the satellite operator's site 120. If the interaction interface 130 determines that the input is related to the Internet, then the consumer's input is passed through the interconnect 140, to the Internet 160, and ultimately to the appropriate Web site 170 where the merchant can be contacted. The merchant then processes the input (in this case an order for a product) and generates a response to the consumer. This response is sent back through the Internet 160, through the interconnect 140, and processed in the interaction interface 130. The interaction interface 130 determines that the information received is a response to the consumer and routes the data to the satellite transmission facility 155 where the data is sent to the satellite 100 and ultimately delivered 105 to the consumer 110. In this example, the response may be comprised of an "order accepted" message, it may ask for more information from the consumer, it may be an initiation of the payment protocol for the item ordered, or it may contain any other information related to the consumer's initial request to purchase an item.

Alternatively, the satellite TV operator site may host a merchant's site providing the merchant site services 150 locally within the satellite TV operator site 120. Therefore, when the consumer interacts with his television or set-top box 110 and provides input over the telephone line 115 to the interaction interface 130, the interaction information is directed to the local merchant's site 150 (rather than the Internet 160), where the local site responds to the consumer 110 via transmission 125, 105 through the satellite 100. Or, merchants may have their own information systems in their own locations (not shown in FIG. 1), connected to the satellite system 120, in which case the interaction information is directed in this same manner.

Figure 2:
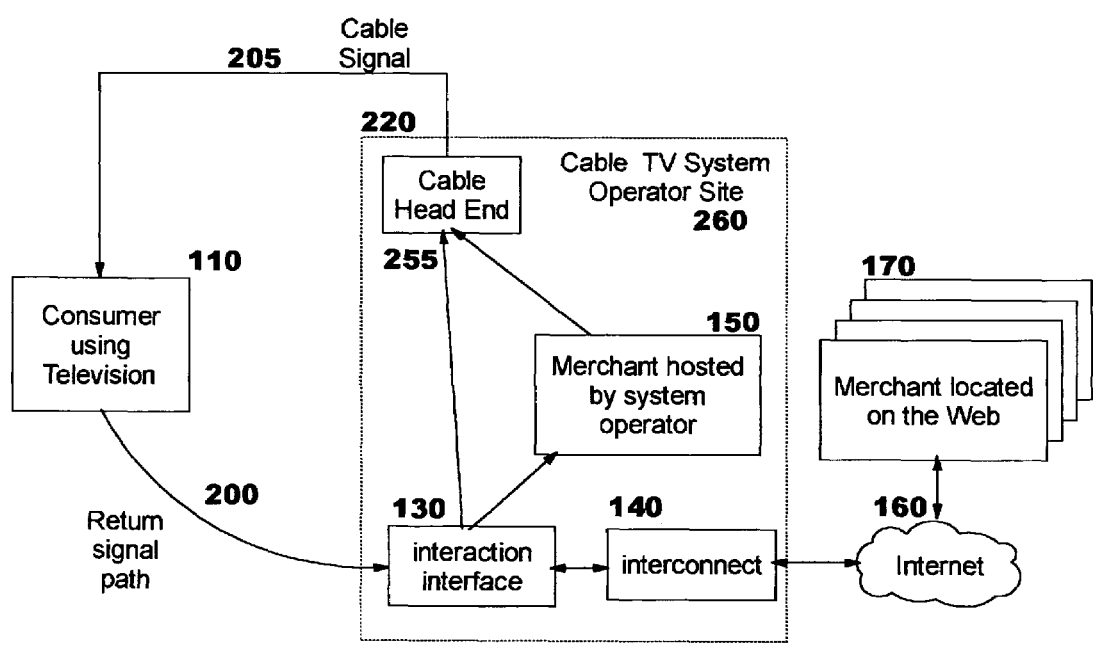

FIG. 2 depicts a typical cable television system environment in which the present invention may be practiced. The cable system 220 is similar to the satellite system 120 depicted in FIG. 1, with the exceptions that the satellite antenna 155 and satellite 100 are replaced by the cable head end 255, the satellite broadcast 105 is replaced by the cable signal 205, and the phone line 115 is replaced by a return signal path 200. When used with a cable TV system 220, as stated above, the present invention preferably makes use of this return signal path 200 to allow communication from the consumer's TV or set-top box 110 to other participants such as the cable provider. This return signal path 200 is used to communicate purchase requests for the TV commerce transaction, as well as other information specific to the present invention, from the consumer 110 to merchants 150, 170. These merchants may be attached to the cable system 220 in several ways, analogous to those which have been described with reference to the satellite system of FIG. 1.

It will be obvious how the analogous transmissions occur in a broadcast television environment, which has not been depicted.

Interactive retail merchandising and purchasing can be conducted in the satellite TV system of FIG. 1 or the cable TV system of FIG. 2, or in the broadcast television environment. These different environments will be referred to hereinafter as "interactive television systems" or "interactive television environments" for ease of reference. A merchant can display an offer to a TV viewer by sending data through the interactive television system. The consumer can then accept an offer and make a payment using the return signal path. The payment for an item may be made in a number of ways. The payment may be made by entering credit card information into a form that is transmitted from the merchant to the consumer. Or, one of a number of specialized payment protocols may be used to exchange payment-related messages for the purchase. Examples of these payment protocols include: (i) Secure Electronic Transactions, or SET™, defined by MasterCard®, Visa®, and other companies; (ii) the protocol defined by the X9.59 standard, titled "ANSI X9.59-199x for the Financial Services Industry: Account-Based Secure Payment Objects", of the American National Standards Institute; or (iii) a 4-Party Internet Credit/Debit Protocol as disclosed in U.S. Pat. No. 6,327,578 (Ser. No. 09/221,869, filed Dec. 29, 1998). These payment protocols are augmented according to the present invention to include TV context information related to a consumer's TV-based purchase, as will be discussed in more detail below. ("SET" is a trademark of SET Secure Electronic Transaction LLC, "MasterCard" is a registered trademark of MasterCard International Incorporated, and "Visa" is a registered trademark of Visa International Service Association.)

In Web-based shopping of the prior art where the consumer uses his personal computer, purchases of products may be made simply and quickly using a wide variety of payment techniques. Often, these payment techniques include secure mechanisms for transmitting the security-sensitive payment information (such as a user's credit card number) across the inherently non-secure Internet. One such security mechanism is known as a "wallet". A "wallet" is the term used to describe software that securely stores personal information on the wallet owner's computer (such as the wallet owner's credit card numbers and billing address). When a purchase is made over the Internet, the wallet software provides the consumer's personal information to the merchant as part of the purchasing transaction, thereby relieving the consumer of the burden of remembering and retyping the stored information for each transaction. Server-based wallet software implementations are also known in the art, where the wallet software operates either entirely or partly on a network-based server. These wallets are accessed over the network by the consumer's browser or by thin-client software that, at a minimum, assures authentication of the consumer. Use of any of the payment protocols described above for the present invention preferably uses this same type of special wallet software implemented as a client-based wallet within the consumer's TV, set-top box, or in equipment connected to such device at the consumer's location, or may alternatively be implemented as a server-based wallet. (Note that while the discussions of the preferred embodiments herein are in terms of using a client-based wallet, it will be obvious to one of ordinary skill in the art how these embodiments are to be modified when a server-based wallet is used.)

The input provided by the consumer when making purchases over the Internet 160 (or from a locally-hosted merchant 150) according to the present invention may be comprised of many elements such as the consumer's name, address, charge card information, etc. According to the present invention, this information is augmented with what is referred to herein as "TV context" information. TV context information may come from a variety of sources, such as from the digital data stream transmitted with a television program or advertisement, from the specially-adapted TV or set-top box, etc. Examples of this TV context information include:

identification of the consumer, his TV, and/or his set-top box subscriber information, when the consumer is viewing cable or satellite television, identifying the consumer or account that pays for access to the cable or satellite service. (Note that the consumer actually paying for a purchase might be different from the consumer subscribing for the cable or satellite TV access service.)

identification of the TV program, channel, and/or station being displayed at the time of purchase identification of a contract, royalty or other arrangement specifying payments due to a TV originator TV originator identifier, name, address, bank name or bank identifier, bank account name and number, or similar information date and time of original TV program broadcast start and stop time of TV viewing; length of time TV has been turned on or tuned to a particular program; TV viewing records for recent past identification, date, and/or time of TV advertisement from which consumer made a purchase identification of advertising agency, advertising placement agency or distributor, or of advertisement producer associated with TV advertisement from which consumer made a purchase By providing pertinent TV context information in the messages that flow with payment protocols, the present invention enables TV originators to receive a portion of the revenues related to TV commerce occurring on their systems and from their advertisements and programs. The manner in which the present invention facilitates this allocation and distribution of the revenue stream will be discussed in more detail below. In addition, this TV context information can be used advantageously to enable merchants to know what TV program, station, or channel was being viewed when the consumer made a purchase, what day and time the program or advertisement aired, which (if any) cable system or satellite system the consumer subscribes to, etc. By keeping records of such information, merchants can optimize placement of their advertisements. Targeted advertising is also possible when monitoring TV context information related to TV commerce. For example, the interconnect or other software running in the satellite or cable TV operations center (see FIGS. 1 and 2) can monitor payment messages, and determine which consumers are paying what to which merchants.

Using any of the specialized payment protocols (SET, ANSI X9.59, and the 4 Party Credit/Debit Protocol) discussed previously, merchants eventually present payment messages to banks for settlement—whether the payment protocol is used in the TV commerce scenario of the present invention or with Web-based shopping of the prior art. The banks involved in such transactions are typically referred to as "issuer banks" and "acquirer banks", or equivalently "issuing banks" and "acquiring banks". An issuing bank is the bank that issues a consumer's credit or debit card (and may also perform functions such as verifying that the card is valid as part of a purchase transaction). An acquiring bank is the merchant's bank. The acquiring bank is responsible for processing a credit or debit card transaction on behalf of a merchant. The interactions between these issuing and acquiring banks, as well as the consumer and merchant, will be described in more detail below. By augmenting the payment protocol messages with TV context information according to the present invention, the acquiring bank can then use the presented payment messages to allocate and distribute a portion of the consumer's payment to one or more TV originators involved in the consumer's purchase.

Figure 3:
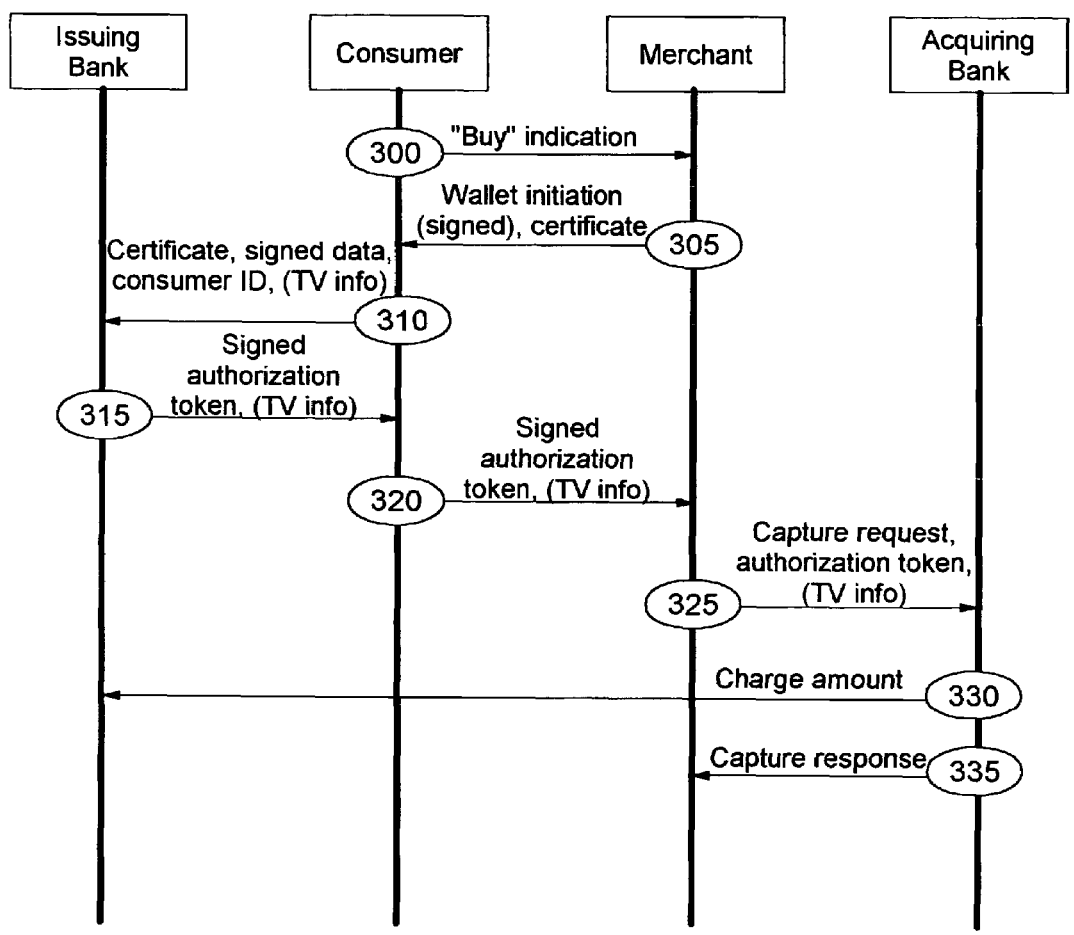
FIGS. 3 and 4 illustrate the transaction flows with which the preferred embodiments of the present invention may be implemented when using a 4-party credit/debit protocol or a 3-party credit/debit protocol, respectively.

FIG. 3 illustrates the transaction flows with which a first preferred embodiment of the present invention may be implemented when using the afore-mentioned 4-Party Credit/Debit protocol. (Note that when other protocols are used, the messages exchanged, as well as the names of those messages, may vary slightly from the scenario depicted in FIG. 3 and in FIG. 4, which is discussed below. For example, additional message exchanges may be required to perform set-up operations in various protocols. It will be obvious to one of skill in the art how the message flows depicted and described herein are to be altered when a different protocol is used.) The process is initiated by the consumer using a browser incorporated in his television or set-top box to purchase a merchant's product. Once the selection (or selections, in the situation where the consumer is provided with the capability for selecting more than one product per purchase transaction) has been made, the consumer will then select a "buy" button or a "pay" button or other type of selection that indicates that the consumer wishes to buy the product(s) or service(s). The TV context information of the present invention is then preferably gathered from the digital TV data stream and/or the television or set-top box. (Alternatively, parts of this context information which are not dynamic in nature, such as the identification of the set-top box, identification of the consumer, etc., may be gathered later in the process, such as when the consumer has received the wallet initiation message described below and is preparing to forward information to the issuing bank). As previously stated, the TV context may contain information to uniquely identify the pertinent TV originator(s), and any other data pertinent to the transaction as has been described above. In particular, the TV context information indicates the fact that the transaction originates from a television or set-top box operating in a TV delivery system.

The "buy" indication 300 is then sent to the merchant's Web site or to a merchant site hosted by the television provider (refer to the descriptions of FIGS. 1 and 2, above, for more details on the flow of purchase messages through satellite and cable television systems). The merchant processes the information (i.e. the consumer's selections), and creates a wallet initiation message. This message preferably contains a payment amount, a description of the order, a timestamp, a random nonce, and possibly additional data depending on the requirements of a particular merchant. A random nonce is a random number generated for the purpose of uniquely identifying this transaction, according to the prior art. The merchant digitally signs this initiation message using a digital certificate that has been provided to the merchant by the acquiring bank. The signed initiation message and digital certificate are then sent 305 to the consumer. (Techniques for digitally signing messages to ensure the message's authenticity, and the techniques with which digital certificates are used for protecting the security of electronic messages, are well known in the art and will not be described in detail herein.)

Receipt of the wallet initiation message 305 causes the consumer's browser (or equivalent software) to start the consumer's wallet (or equivalent) program. The consumer is prompted to log on to the wallet program according to the prior art, where the log on process typically requires the user to enter a user identification and a password, or a SmartCard, and/or to make use of some other appropriate means (which may include biometrics and/or specialized hardware) of authenticating the consumer. The signed initiation message is verified by the wallet software. Assuming the verification is successful, the wallet program then sends a message 310 to the issuing bank, where this message includes all the data from the wallet initiation message 305, the consumer's identity and authentication data from the log-on process, and the TV context information which has been gathered. In the preferred embodiment, this message 310 is digitally signed by the consumer's wallet program before transmission to ensure that the TV context and other information cannot be altered. The consumer's digital certificate may also be transmitted with message 310. (Alternatively, the issuing bank may retrieve the consumer's public key from a certificate registry using the consumer's identity to locate the consumer's key and/or certificate.) Other techniques for authenticating the consumer to the issuing bank may be used in place of a digital signature and certificate without deviating from the inventive concepts disclosed herein, such as: a digital signature without a certificate; use of a symmetric (i.e. private) key shared by the consumer and issuing bank; use of a user ID and password; use of biometrics; etc. Examples of well-known techniques which may be used for authentication with a shared key include (1) hashed-MAC (message authentication code), or "HMAC", which uses a shared key and a cryptographic hashing function and which is described in RFC 2104 from the Internet Engineering Task Force, and (2) CBC-MAC, which uses a shared key and an encrypted block computed using a symmetric encryption algorithm and which is described in various standards from the International Organization for Standardization (ISO).

Figure 4:
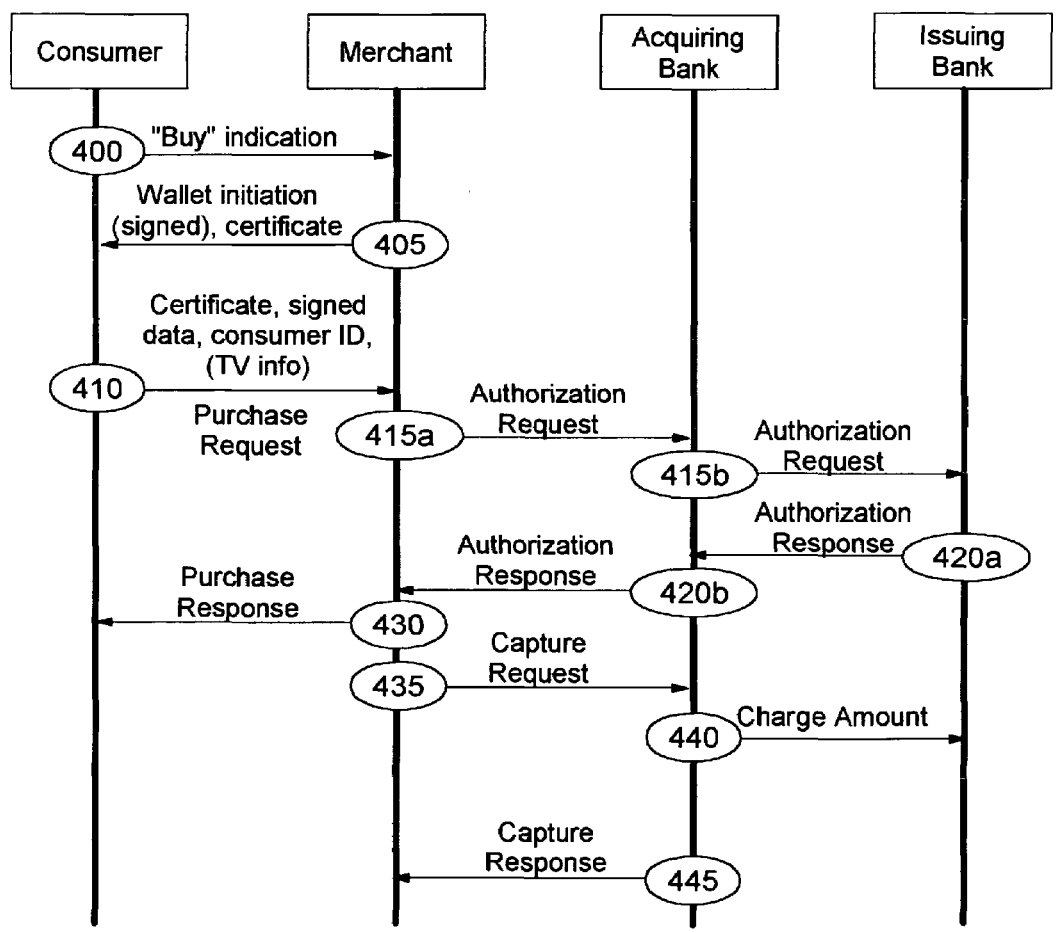

Note that the descriptions of message flows in FIGS. 3 and 4 refer to sending messages to and from the issuing bank and acquiring bank. It may happen in a particular case that the function of the 4-Party and 3-Party protocols is implemented in an issuing gateway connected between the issuing bank and consumer, and/or in an acquiring gateway connected between the merchant and acquiring bank. These gateways are not shown in FIGS. 3 and 4 for ease of illustration. However, it will be apparent to one of skill in the art that the following descriptions referring to functions operating in the respective banks may apply equally to functions implemented in these gateways.

The issuing bank, upon receipt of message 310, verifies the merchant's signature using the merchant's digital certificate and validates that the merchant and the issuer share a common financial arrangement such as an association with MasterCard, Visa, an ATM network, or similar financial organization. The issuing bank then verifies the consumer's identity and his account information (e.g. ensuring that the account is still open and is able to accept this charge, etc.), and verifies the consumer's digital signature. Upon successful verification, the issuing bank generates and sends 315 a signed authorization token to the consumer's wallet program, along with the issuing bank's digital certificate. The authorization token preferably contains all the data from message 305, plus a merchant identifier and a reference to the consumer's credit or debit card number. The TV context information from message 310 is also included in this response 315.

The consumer's wallet program forwards 320 the authorization token to the merchant, who can verify the issuing bank's digital signature and the data in the authorization token. Since the issuing bank has created this signed authorization of payment for the consumer's purchase, the merchant does not need to separately request an authorization of credit card information. The merchant may also process the TV context information; however, since the authorization token is signed by the issuing bank, the merchant is prevented from altering (maliciously or otherwise) any of the data including the TV context information.

At some later time, possibly at the end of the day or even the end of the week, the merchant submits 325 the authorization token in a "capture request" to the acquiring bank, where a capture request signals the acquiring bank to post the charge 330 to the consumer's credit card or to his debit account. The TV context information included in the capture request according to the present invention may then be processed by the acquiring bank (see FIGS. 5 and 6) to allocate revenues to the TV originators. As indicated at 335, the acquiring bank sends a capture response message to the merchant. This capture response serves to acknowledge the capture request 325. (Note that a single capture response 335 may acknowledge multiple capture requests, and thus a period of time may elapse before message 335 is transmitted.)

An important aspect of the present invention is the fact that the merchant cannot tamper with any of the contents of the authorization token, specifically including the TV context information. Since the token is digitally signed by the issuing bank, any modification thereof will be detected by the acquiring bank. The acquiring bank will then deny payment to the merchant, and prevent allocation of any revenues to TV originators.

FIG. 4 illustrates the transaction flows with which a second preferred embodiment of the present invention may be implemented when using a 3-Party Credit/Debit Protocol (such as SET or X9.59). When using a 3-Party system, the purchase request is forwarded from the consumer to the merchant, and the merchant then forwards this information to the acquiring bank, which forwards it to the issuing bank. The consumer does not interact with the issuing bank in a 3-Party system (in contrast to the approach described above for the 4-Party system); rather, the acquiring bank contacts the issuing bank (e.g. to determine whether the consumer's account is still active, and whether the account can accept new charges or debits, etc.) in this system. The acquiring and issuing functions in a 3-Party system may be performed by different card companies or banks, or they may be performed by a single card company or bank (including the scenario where different entities within the single card company or bank perform the acquiring and issuing functions). 3-Party systems are commonly used by credit card operations such as MasterCard and Visa.

The transaction flows of FIG. 4 are similar to those of FIG. 3, and begin with the consumer initiating the process by creating a "buy" indication 400 using a browser (as described in FIG. 3). The TV context information is then gathered. (As described above, static portions of the TV context information which are unrelated to the point in time at which the TV commerce transaction was initiated may alternatively be gathered at a later point in the process.) The "buy" indication 400 is sent to, and received by, the merchant and is processed using techniques which do not form part of the present invention. The merchant responds 405 to the consumer with a wallet initiation message which is digitally signed by the merchant and which includes the merchant's digital certificate. The consumer logs on to the wallet program (as described with reference to FIG. 3). The consumer's wallet program sends 410 the information from message 405, the gathered TV context information, and the consumer's identification and other information provided by the wallet program to the merchant. Preferably, this information is signed by the consumer before transmission, as described above with reference to message 310. This message 410 is a purchase request from the consumer. Following receipt of message 410, the merchant sends an authorization request 415a to the acquiring bank, which is then forwarded 415b to the issuing bank. Messages 415a and 415b constitute a request for the issuing bank to charge the consumer's account for the amount indicated, and to pay the merchant indicated in the message. The issuing bank verifies the message contents, as described above with reference to the issuing bank functions in FIG. 3 (e.g. determining whether the consumer's account is valid and whether it has sufficient funds or credit for this transaction), and begins processing the information. The issuing bank, upon a successful verification, sends 420a an authorization response to the acquiring bank, which then forwards 420b this message to the merchant. The merchant, in turn, sends 430 a purchase response to the consumer. The merchant also sends 435 a capture request to the acquiring bank, after which the acquiring bank sends a message 440 to the issuing bank, indicating that the consumer's account is to be charged for the purchase. The TV context information included in the capture request may then be processed by the acquiring bank (as described for FIG. 3 above). A capture response is sent 445 from the acquiring bank to the merchant, as discussed with reference to message 335 of FIG. 3.

Alternative scenarios exist whereby the initial message flows 300 and 305, as well as 400 and 405, may be omitted. For example, the consumer may wish to simply initiate a payment to his account at a particular merchant, without purchasing new merchandise or services. Preferably, the wallet functionality described above will be invoked by the appearance of an interactive advertisement, making the functionality of the present invention available to the consumer. Alternatively, this functionality may be invoked by the consumer on request (e.g. by pressing a designated function key, selecting an icon or an item from a drop-down list, etc.) It will be obvious to one of ordinary skill in the art how the logic to handle these alternative scenarios may be implemented.

Figure 5:
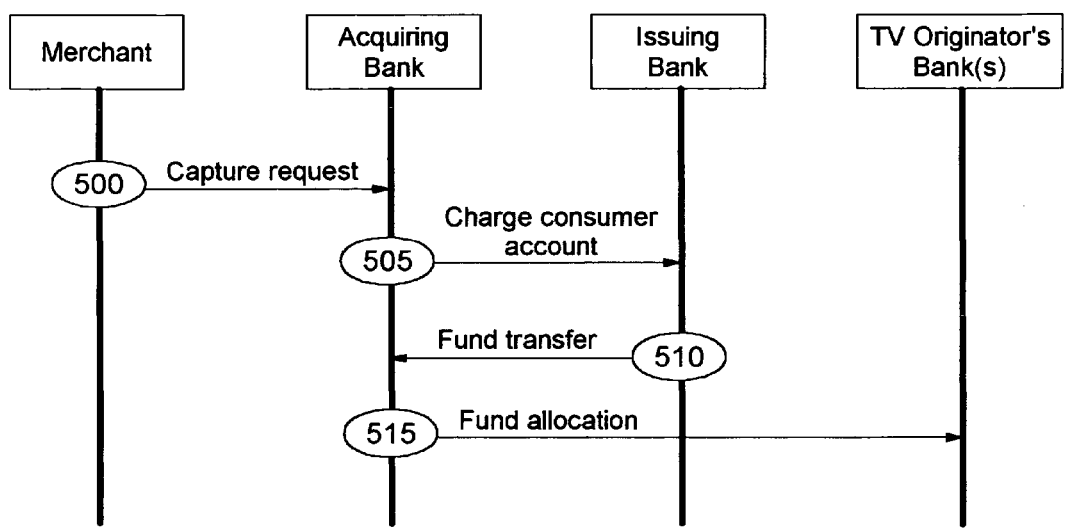
FIG. 5 illustrates the transaction flows with which allocation and distribution of finds may be made, according to a preferred embodiment of the present invention.

FIG. 5 illustrates the transaction flows with which allocation and distribution of funds may be made, according to the preferred embodiments of the present invention. (While FIG. 5 specifically depicts the flows in a 4-Party system, it will be obvious to one of skill in the art how the analogous 3-Party flows may be substituted. In particular, if the acquiring bank and issuing bank are replaced by a single entity within a single bank, then flows 505 and 510 may be omitted.) The capture request (which represents the same message shown in FIG. 3 at 325, or equivalently, message 435 in FIG. 4) is sent 500 from the merchant to the acquiring bank. The acquiring bank forwards 505 the charge (indicating, inter alia, the amount of the purchase) to the issuing bank for payment. The issuing bank processes the information, deducts the funds from the consumer's debit card or charges the amount to the consumer's credit card, and transfers 510 the appropriate funds to the acquiring bank. The issuing bank typically charges a percentage of the purchase amount for its services. This amount (e.g. from 2 to 8 percent) is deducted by the issuing bank from the total amount before the funds are transferred to the acquiring bank. The acquiring bank typically also collects a fee for its services (again, often from 2 to 8 percent) which is deducted from the transferred funds. The acquiring bank preferably also processes the TV context information (see FIG. 6) at this point, where the context information was received as part of the capture request 500 according to the present invention, and allocates part of the revenue stream to the TV originators. This fund allocation may occur either directly to the TV originator's bank 515 by electronic deposit, it may be made by check, or it may be made by some other prearranged mechanism. When the TV context information processing is completed, the remaining funds are transferred to the merchant's bank account at the acquiring bank (or perhaps at another bank where the merchant maintains an account).

Figure 6:
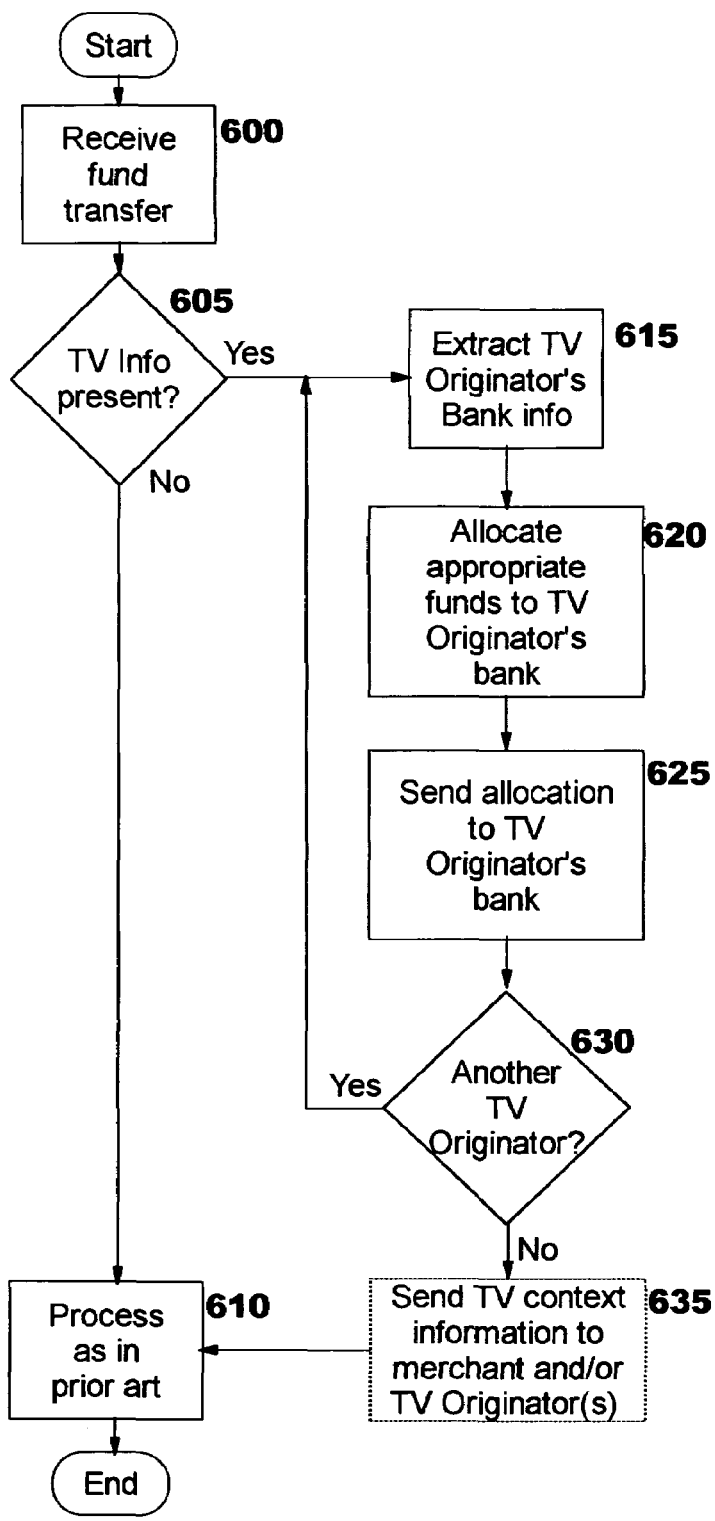
FIG. 6 is a flowchart illustrating the logic involved with allocation and distribution of collected funds according to the preferred embodiments of the present invention.

FIG. 6 is a flowchart illustrating the logic involved with allocation and distribution of collected funds according to the preferred embodiments of the present invention. The acquiring bank at Block 600 receives the transferred funds from the issuing bank (see flow 510 of FIG. 5). (In the 3-Party system scenario where a single entity within a single card company or bank performs both the acquiring and issuing functions, Block 600 represents the card company or bank receiving the funds directly from the consumer's account.) The payment message is then checked at Block 605 to determine if TV context information is present. If Block 605 has a negative result, then processing continues to Block 610 where the funds are processed according to the prior art (including deduction of the acquiring bank's or card company's fee, and distribution of the remaining funds to the merchant's account). If Block 605 has a positive response, then processing continues to Block 615 where the TV context information is extracted from the payment message. At Block 620, funds are allocated to the TV originator as indicated by the TV context information. The manner in which the amount of funds to allocate to a particular originator is determined may vary from one implementation of the present invention to another, without deviating from the inventive concepts disclosed herein. The information needed for the allocation (such as a percentage rate to apply) may be present in the transmitted messages. Or, this information may be determined by consulting a stored repository of rates; by coding the information into a configuration file locally accessible to the code processing the allocation; by coding the information directly into the code processing the allocation; etc. (It will be obvious that the latter technique is preferably used only when allocation rates are unlikely to change frequently.) Typically, the rates to be used will have been agreed upon by contract terms, and may vary from one TV originator to another.

At Block 625, the finds are either sent directly to the TV originator's bank by direct deposit, or may be sent by some other means of allocation (such as creating a paper check). At Block 630, a check is made to determine if more TV originator information exists to be processed. If Block 630 has a positive result, control returns to Block 615 to process that information. This process occurs iteratively until all TV originator information has been processed. When Block 630 has a negative result, Block 635 indicates optional processing that may occur, whereby the TV context information which has been extracted from the payment message is forwarded to the merchant (and/or to the TV originators identified by Block 615). This optional processing provides the receivers with information related to the TV commerce transaction that can be used for accounting, tracking, targeted advertising, or other purposes. Following this optional processing, or following the negative result at Block 630 when the optional processing is not implemented, control then transfers to Block 610 where the remaining finds (i.e. after the portions allocated to the TV originators have been deducted) are processed according to the prior art. The processing of FIG. 6 then ends.

The technique of the present invention may also be used with television programs which have been recorded, and are being viewed sometime after the original broadcast by a consumer using a VCR or other device. The advertisements or other inducements for a consumer to make an interactive TV commerce purchase are then displayed from this recorded information. Even though the viewing is delayed compared to the actual broadcast, the TV context information related to the time and date of broadcast may be captured if the consumer is using a digital VCR.

Merchandise returns may also be handled properly when the present invention is used, ensuring that TV originators do not receive inappropriate revenue for retail transactions that are eventually refunded. With existing credit and debit card systems, when a consumer returns merchandise, a merchant can issue refunds via the credit or debit card system. With SET, these refunds are directly associated, by transaction identifier and other information, with the original payment for the merchandise. In particular, any TV context information according to the present invention can be included (either directly or by reference) in a capture token defined by SET. This TV identifying information permits the acquiring bank or credit card company to partially or completely reverse the original allocation to a TV originator.

While the preferred embodiment of the present invention has been described, additional variations and modifications in that embodiment may occur to those skilled in the art once they learn of the basic inventive concepts. In particular, alternative payment protocols implementing the semantics described herein may be used for transferring TV context information. Therefore, it is intended that the appended claims shall be construed to include both the preferred embodiment and all such variations and modifications as fall within the spirit and scope of the invention.

I claim:

1. A method for enabling television ("TV") commerce to generate revenue streams for TV originators in an interactive television environment, said environment having a connection to a computer network and said method comprising steps of:

initiating a TV commerce transaction by a consumer using said interactive television environment, wherein said transaction pertains to an offering of a merchant;

gathering TV context information related to a TV context in which said offering is presented to said consumer, wherein said TV context information enables identifying one or more TV originators, each of which is distinct from said merchant;

digitally signing said gathered TV context information, by a device used by said consumer, on behalf of said consumer;

including said digitally-signed TV context information in a message sent from said device to said merchant, wherein receipt of said message by said merchant triggers payment processing for said transaction;

forwarding said digitally-signed TV context information from said merchant to an acquirer that is distinct from, and processes payments for, said merchant; and upon verifying, by said acquirer, that payment for said transaction is authorized and that said device created said digital signature on said TV context information, automatically allocating a portion of said authorized payment to one or more of said TV originators, according to said TV context information, and reducing an amount of said payment to be paid to said merchant by said automatically allocated portion.

2. The method according to claim 1, wherein said verification by said acquirer that said payment for said transaction is authorized further comprises verifying that an issuer digital signature on an authorization token has been created by an issuer of an account of said consumer to signify that said issuer authorizes said payment for said transaction using said account.

3. A system for enabling television ("TV") commerce to generate revenue streams for TV originators in an interactive television environment, said environment having a connection to a computer network and said system comprising:

means for initiating a TV commerce transaction by a consumer using said interactive television environment, wherein said transaction pertains to an offering of a merchant;

means for gathering TV context information related to a TV context in which said offering is presented to said consumer, wherein said TV context information enables identifying one or more TV originators, each of which is distinct from said merchant;

means for digitally signing said gathered TV context information, by a device used by said consumer, on behalf of said consumer;

means for including said digitally-signed TV context information in a message sent from said device to said merchant, wherein receipt of said message by said merchant triggers payment processing for said transaction;

means for forwarding said digitally-signed TV context information from said merchant to an acquirer that is distinct from, and processes payments for, said merchant; and upon verifying, by said acquirer, that payment for said transaction is authorized and that said device created said digital signature on said TV context information, means for automatically allocating a portion of said authorized payment to one or more of said TV originators, according to said TV context information, and reducing an amount of said payment to be paid to said merchant by said automatically allocated portion.

4. The system according to claim 3, wherein said verification by said acquirer that said payment for said transaction is authorized further comprises verifying that an issuer digital signature on an authorization token has been created by an issuer of an account of said consumer to signify that said issuer authorizes said payment for said transaction using said account.

5. A computer program product for enabling television ("TV") commerce to generate revenue streams for TV originators, said computer program product embodied on computer readable media readable by one or more computing systems in an interactive television environment having a connection to a computer network and comprising:

computer-readable program code means for initiating a TV commerce transaction by a consumer using said interactive television environment, wherein said transaction pertains to an offering of a merchant;

computer-readable program code means for gathering TV context information related to a TV context in which said offering is presented to said consumer, wherein said TV context information enables identifying one or more TV originators, each of which is distinct from said merchant;

computer-readable program code means for digitally signing said gathered TV context information, by a device used by said consumer, on behalf of said consumer;

computer-readable program code means for including said digitally-signed TV context information in a message sent from said device to said merchant, wherein receipt of said message by said merchant triggers payment processing for said transaction;

computer-readable program code means for forwarding said digitally-signed TV context information from said merchant to an acquirer that is distinct from and processes payments for, said merchant; and upon verifying, by said acquirer, that payment for said transaction is authorized and that said device created said digital signature on said TV context information, computer-readable program code means for automatically allocating a portion of said authorized payment to one or more of said TV originators, according to said TV context information, and reducing an amount of said payment to be paid to said merchant by said automatically allocated portion.

6. The computer program product according to claim 5, wherein said verification by said acquirer that said payment for said transaction is authorized further comprises verifying that an issuer digital signature on an authorization token has been created by an issuer of an account of said consumer to signify that said issuer authorizes said payment for said transaction using said account.

* * * * *